(12) United States Patent
Nurmi

(10) Patent No.: US 9,664,527 B2
(45) Date of Patent: May 30, 2017

(54) METHOD AND APPARATUS FOR PROVIDING ROUTE INFORMATION IN IMAGE MEDIA

(75) Inventor: Mikko Antero Nurmi, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1640 days.

(21) Appl. No.: 13/035,497

(22) Filed: Feb. 25, 2011

(65) Prior Publication Data

US 2012/0221241 A1    Aug. 30, 2012

(51) Int. Cl.
*G01C 21/36*    (2006.01)
*G01C 21/20*    (2006.01)

(52) U.S. Cl.
CPC ......... *G01C 21/3647* (2013.01); *G01C 21/20* (2013.01); *G01C 21/3602* (2013.01)

(58) Field of Classification Search
CPC . G01C 21/3647; G01C 21/20; G01C 21/3602
USPC .................................................. 701/200, 400
See application file for complete search history.

(56) References Cited

U.S. PATENT DOCUMENTS

| | | | |
|---|---|---|---|
| 8,264,504 B2* | 9/2012 | Naimark ....................... | 345/629 |
| 8,428,873 B2* | 4/2013 | Chau et al. ................... | 701/436 |
| 2003/0160867 A1* | 8/2003 | Ohto et al. .................... | 348/135 |
| 2005/0251325 A1* | 11/2005 | Kudo et al. ................... | 701/200 |
| 2006/0002590 A1* | 1/2006 | Borak ............................ | 382/104 |
| 2007/0024527 A1* | 2/2007 | Heikkinen et al. ............... | 345/9 |
| 2009/0254268 A1* | 10/2009 | Figueroa ....................... | 701/201 |
| 2010/0325154 A1* | 12/2010 | Schloter et al. ............. | 707/770 |
| 2011/0098056 A1* | 4/2011 | Rhoads et al. ............. | 455/456.1 |
| 2011/0313653 A1* | 12/2011 | Lindner ........................ | 701/201 |
| 2013/0085662 A1* | 4/2013 | Amer-Yahia et al. ........ | 701/400 |

FOREIGN PATENT DOCUMENTS

| | | |
|---|---|---|
| JP | 2007-324986 A | 12/2007 |
| WO | WO 2008/117348 A1 | 10/2008 |
| WO | WO 2009/011838 A2 | 1/2009 |

OTHER PUBLICATIONS

International Search Report for PCT/FI2012/050070 dated May 15, 2012, pp. 1-5.
International Written Opinion for PCT/FI2012/050070 dated May 15, 2012. pp. 1-8.

* cited by examiner

*Primary Examiner* — Courtney Heinle
(74) *Attorney, Agent, or Firm* — Ditthavong & Steiner, P.C.

(57) ABSTRACT

An approach is provided for recognizing objects in media content. The capture manager determines to detect, at a device, one or more objects in a content stream. Next, the capture manager determines to capture one or more representations of the one or more objects in the content stream. Then, the capture manager associates the one or more representations with one or more instances of the content stream.

20 Claims, 11 Drawing Sheets

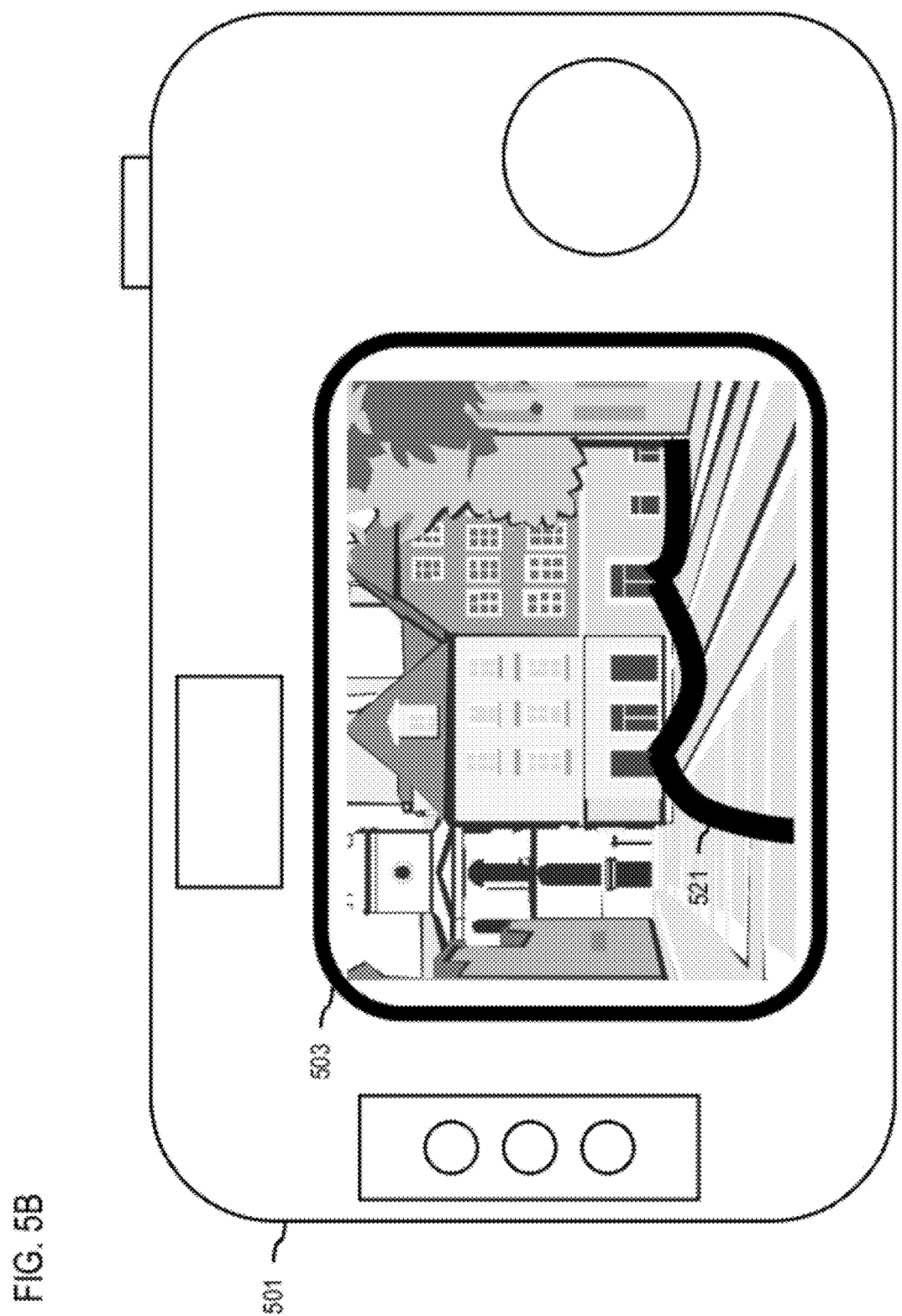

METHOD AND APPARATUS FOR PROVIDING ROUTE INFORMATION IN IMAGE MEDIA

BACKGROUND

Service providers and device manufacturers (e.g., wireless, cellular, etc.) are continually challenged to deliver value and convenience to consumers by, for example, providing compelling network services. For example, many modern devices (e.g., smartphones, handsets, cameras, etc.) are commonly equipped with imaging devices (e.g., camera and video capture modules) and other sensors (e.g., location sensors) that enable a variety of advanced functions. However, even with the availability of such advanced sensors, their use with respect to imaging (e.g., taking pictures and/or videos) has generally been limited to geo-tagging image files. Accordingly, service providers and device manufacturers face significant challenges to enabling innovative uses of available sensors in various device applications including imaging.

SOME EXAMPLE EMBODIMENTS

Therefore, there is a need for an approach leveraging the use of location and/or other device sensor information to make imaging task more engaging for consumers by for instance providing historical route information as overlays in captured images.

According to one embodiment, a method comprises processing and/or facilitating a processing of one or more images to determine, at least in part, location information, orientation information, or a combination thereof of a device that captured or is capturing the one or more images. The method also comprises determining route information. The method further comprises processing and/or facilitating a processing of the one or more images, the location information, the orientation information, the route information, or a combination thereof to generate at least one rendering of at least a portion of the route information for display in the one or more images.

According to another embodiment, an apparatus comprises at least one processor, and at least one memory including computer program code, the at least one memory and the computer program code configured to, with the at least one processor, cause, at least in part, the apparatus to process and/or facilitate a processing of one or more images to determine, at least in part, location information, orientation information, or a combination thereof of a device that captured or is capturing the one or more images. The apparatus is also caused to determine route information. The apparatus is further caused to process and/or facilitate a processing of the one or more images, the location information, the orientation information, the route information, or a combination thereof to generate at least one rendering of at least a portion of the route information for display in the one or more images.

According to another embodiment, a computer-readable storage medium carries one or more sequences of one or more instructions which, when executed by one or more processors, cause, at least in part, an apparatus to process and/or facilitate a processing of one or more images to determine, at least in part, location information, orientation information, or a combination thereof of a device that captured or is capturing the one or more images. The apparatus is also caused to determine route information. The apparatus is further caused to process and/or facilitate a processing of the one or more images, the location information, the orientation information, the route information, or a combination thereof to generate at least one rendering of at least a portion of the route information for display in the one or more images.

According to another embodiment, an apparatus comprises means for processing and/or facilitating a processing of one or more images to determine, at least in part, location information, orientation information, or a combination thereof of a device that captured or is capturing the one or more images. The apparatus also comprises means for determining route information. The apparatus further comprises means for processing and/or facilitating a processing of the one or more images, the location information, the orientation information, the route information, or a combination thereof to generate at least one rendering of at least a portion of the route information for display in the one or more images.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A-5D are diagrams of user interfaces for depicting rendering of route information in image media, according to one embodiment;

DESCRIPTION OF SOME EMBODIMENTS

Examples of a method, apparatus, and computer program for providing route information in image media (e.g., photographs, videos) are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
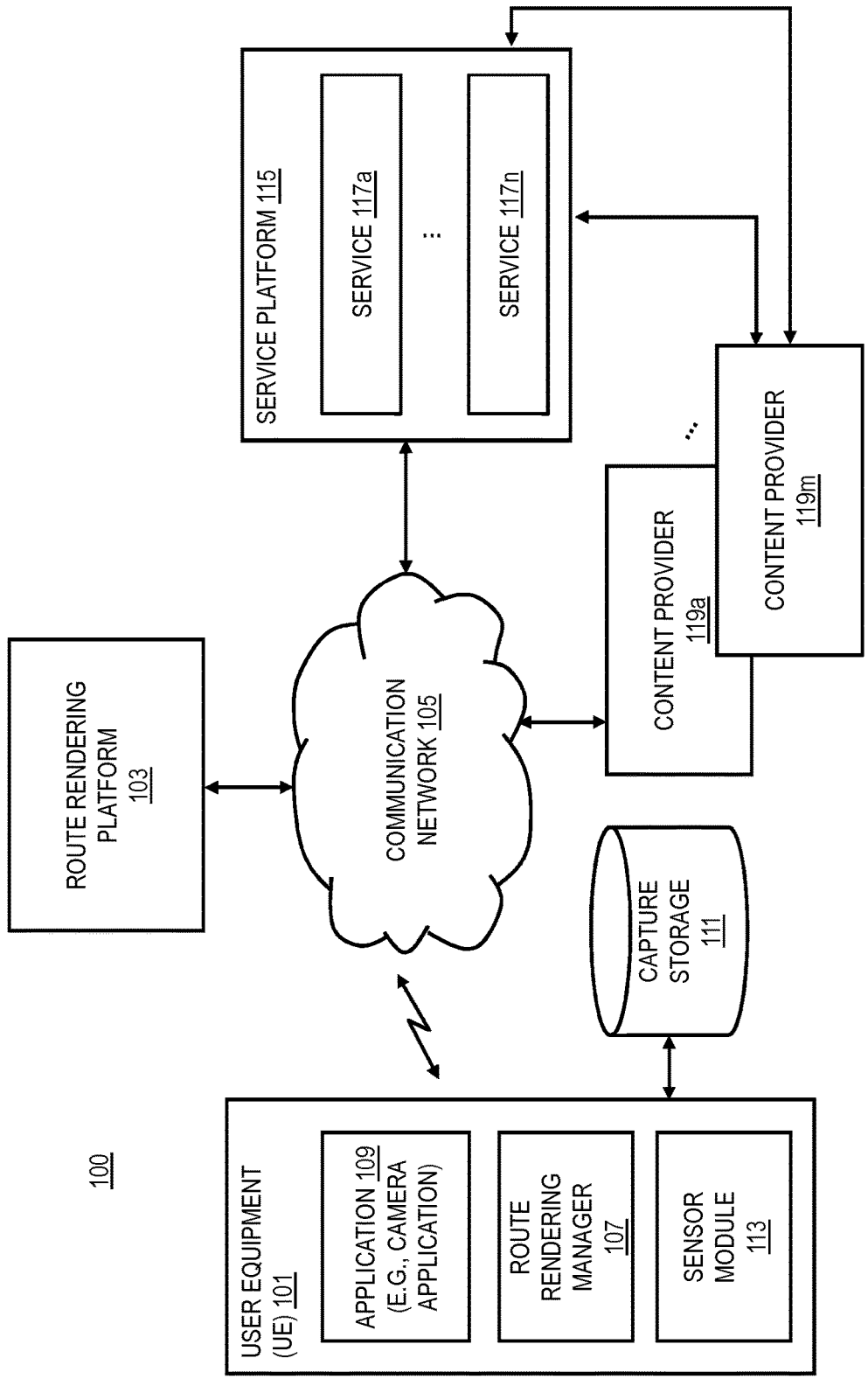
FIG. 1 is a diagram of a system capable of providing route information in image media, according to one embodiment.

FIG. 1 is a diagram of a system capable of providing route information in image media, according to one embodiment. It is becoming increasingly popular for service providers and device manufacturers to bundle or make available navigation and mapping services on an array of user devices (e.g., mobile handsets, computers, navigation devices, etc.) Such devices may utilize location based technologies (e.g., Global Positioning System (GPS) receivers, cellular triangulation, assisted-GPS (A-GPS), etc.) to provide navigation and mapping information. As a result, location information often is available on a variety of consumer devices. For example, modern devices may utilize an augmented reality mode to superimpose graphics and text over video images showing buildings in front of the user. Moreover, certain devices may utilize 3D representations (e.g., rendered 3D models) of buildings and streets to provide navigational information.

As shown in FIG. 1, a system 100 builds on the ready availability of location information and introduces the capability to render route information in image media. As used herein, the term route information refers to data captured to show the travel routes or paths taken by one or more devices and/or their associated users through a given location. By way of example, the routes defined with the route information may be actual travel routes physically recorded by movement of a device, routes obtained from another device or service capable of recording movement, or virtual routes specified by a user. Additionally, the term image media refers to pictures, videos, renderings (e.g., augmented reality renderings, virtual reality renderings), virtual worlds, and/or any other graphical depictions of one or more locations. In one embodiment, it is contemplated that the locations can be real-world locations or virtual locations (e.g., in a virtual world such as a gaming world or other virtual reality simulation). Moreover, the images can be presented in two-dimensions or three-dimensions.

More specifically, the system 100 processes one or more images (e.g., photographs, image streams, videos, etc.) to determine the vantage point of a device (e.g., a real or virtual device) that captured or is capturing the images. In one embodiment, the vantage point is defined, at least in part, by a location and orientation of the device to determine, for instance, a field of view or angle of view represented in the processed images. In some embodiments, the characteristics of the capture device (e.g., focal length, image format, etc.) are used, at least in part, to calculate the field of view. Based on the determined location information and the field of view, route information (e.g., including one or more routes associated with one or more users collected over time) can be rendered on the images.

In this way, a user can quickly view whether a particular image captures a location that is associated with routes that may be of interest to the user. For example, the routes may indicate previous paths taken by a user and/or the user's friends. In one embodiment, multiple routes over time may be displayed. In yet another embodiment, characteristics of the route (e.g., the number of times the route has been traveled, an age of the route, type of transport used for the route, etc.) can be depicted in the rendering. For example, more frequently taken or more recent routes can be highlighted more boldly than less frequently taken or older routes.

In one embodiment, the route information may be rendered in real-time or substantially in real-time as the user is viewing a particular scene or location through, for instance, a device viewfinder, augmented reality display, or other real-time image. In another embodiment, the image can be a previously captured image. By way of example, the previously captured image may have been captured by the user or another user. It is also contemplated that the image may be retrieved from other sources such as photo-sharing services, websites, image libraries or databases, content stores, and/or any other source of imagery. In fact, it is contemplated that the image media and the route information may be captured or otherwise obtained from independent sources. In this way, a user can, for instance, download a picture from a website and then process the picture to determine whether the user has traveled through the location depicted in the image.

In one embodiment, following processing and rendering of the route information, the system 100 can associate the route information and/or the rendering of the route information with the image media for later recall or viewing. By way of example, the system 100 can attach the route information or rendering the image media directly as metadata. In addition or alternatively, the route information or rendering may be maintained in as a separate file, and then the file can be associated (e.g., via a timestamp, index, etc.) with the corresponding image media.

In another embodiment, the display or presentation of the route information and/or the rendering of the route information can be controlled by one or more privacy policies imposed, for instance, by the user or other owner of the route information and/or image media. For example, the route information may be displayed only by users with rights or credentials to access the information. In this way, an unauthorized user may view the image, but may not access or view the corresponding route information. In addition, the user may view routes created by or associated with other users on images if such information is shared with or otherwise available to the user. For example, friends can share their travel route information and see which places or routes the friends have both visited when viewing images of various locations or places.

In yet another embodiment, the system 100 enables the route information to be rendered in varying levels of detail. For example, the route or path may be rendered with fewer points to provide a smoother but less detailed rendering of the route. In one embodiment, the user can zoom into the image to view a route in more detail. In another embodiment, the rendering of the route information may be presented as a layer on top of the image, so that the rendering may be enabled or disabled more easily.

In one embodiment, in addition to showing route information on images, the system 100 can also show the direction that the user was looking or facing when the images were captured. By way of example, sections of the images can be color coded to indicate the user's field of view when taking the images.

As noted above, the images can be provided by augmented reality applications (e.g., Layar) that model actual and/or virtual environments in three dimensions. When using an augmented reality application, the system 100 can depict the route information through the three dimensional representation.

In one embodiment, images that include route information (e.g., as metadata) can be queried using a search application. For example, if a user performs a search based on a street name, then images that include the user's routes on that street could be shown as search results.

In one embodiment, users can share route information display in one or more images using social networking services, file sharing services (e.g., photo sharing services), and the like.

In another embodiment, the route information in the images can be interactive. For example, users can jump to a route in an image by using selection means such tapping on the route. Following the selection, the user can follow the route further and see where the user has moved after the visible part of the route in the current image. In one embodiment, the additional portions of the route can be shown in additional images or via other applications (e.g., a mapping application, navigation application, etc.).

As shown in FIG. 1, the system 100 comprises at least one user equipment (UE) 101 having connectivity to a route rendering platform 103 via a communication network 105. In one embodiment, the route rendering platform 103 performs the processes for rendering route information in image media discussed with respect to the various embodiments described herein. Although the route rendering platform 103 is shown as an independent component of the communication network 105, it is contemplated that the route rendering platform 103 may be incorporated into any other component of the system 100 including any of the components discussed below. In one embodiment, a UE 101 may include or be connected to a route rendering manager 107 that may perform all or a portion of the functions described with respect to the route rendering platform 103.

The UE 101 may also execute an application 109 (e.g., a camera application or other imaging application) that can capture images for storage in, for instance, the capture storage 111. In one embodiment, the application 109 may interact with a sensor module 113 to determine location and/or orientation to associate with the captured images to facilitate subsequent rendering of the route information. In one embodiment, the sensor module 113 may include one or more location sensors, magnetometers, accelerometers, image capture modules, and/or other like sensors for determining location and/or orientation information.

For example, the location sensors can determine and/or track the UE 101's location. More specifically, the location can be determined by a triangulation system such as a Global Positioning System (GPS) system, assisted GPS (A-GPS), Cell of Origin, wireless local area network triangulation, or other location extrapolation technologies. Standard GPS and A-GPS systems can use satellites to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location sensors of the sensor module 113 may also utilize multiple technologies to detect the location of the UE 101. GPS coordinates can provide finer detail as to the location of the UE 101.

The sensor module 113 may include magnetometer that can measure the strength and/or direction of a magnetic field. Using the same approach as a compass, the magnetometer is capable of determining the direction of a UE 101 using the magnetic field of the Earth. The front of the image capture device (e.g., a digital camera) (or another reference point on the UE 101) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer is utilized to determine the orientation of the user. This directional information may be correlated with the location information of the UE 101 to determine where (e.g., at which building or other object(s)) the user is pointing towards.

Further, the sensor module 113 may include an accelerometer that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer can determine the angle the UE 101 is pointed as compared to Earth's gravity. In one embodiment, vertical directional data obtained from an accelerometer is used to determine the angle that the user is pointing the UE 101 at. This information in conjunction with the magnetometer information and location information may be utilized to determine a viewpoint or field of view of the UE 101 when capturing an image. As such, this information may be utilized in rendering of route information in the captured image.

In one embodiment, the sensor module 113 can include one or more image capture modules. By way of example, an image capture module may include a camera, a video camera, a combination thereof, etc. In one embodiment, image media is captured in the form of an image or a series of images. The image capture module can obtain the image from a camera and associate the image with location information, magnetometer information, accelerometer information, or a combination thereof. As previously noted, this combination of information may be utilized to determine the viewpoint or field of view of the captured image for rendering route information.

In one embodiment, the route rendering platform 103 may process images obtained from the service platform 115, the services 117a-117n (also collectively referred to as services 117) of the service platform 115, and/or the content providers 119a-119m (also collectively referred to as content providers 119). By way of example, the service platform 115, the services 117, and/or the content providers 119 may include or otherwise support services (e.g., content sharing services, social network services, content stores, content databases that provide one or more of the images.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, wearable device, personal communication system (PCS) device, personal navigation device, personal digital assistants (PDAs), audio/video player, digital camera/camcorder, positioning device, wearable device, head-mounted device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101 and the route rendering platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the route rendering manager 107 and the route rendering platform 103 may interact according to a client-server model. According to the client-server model, a client process sends a message including a request to a server process, and the server process responds by providing a service (e.g., providing map information). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
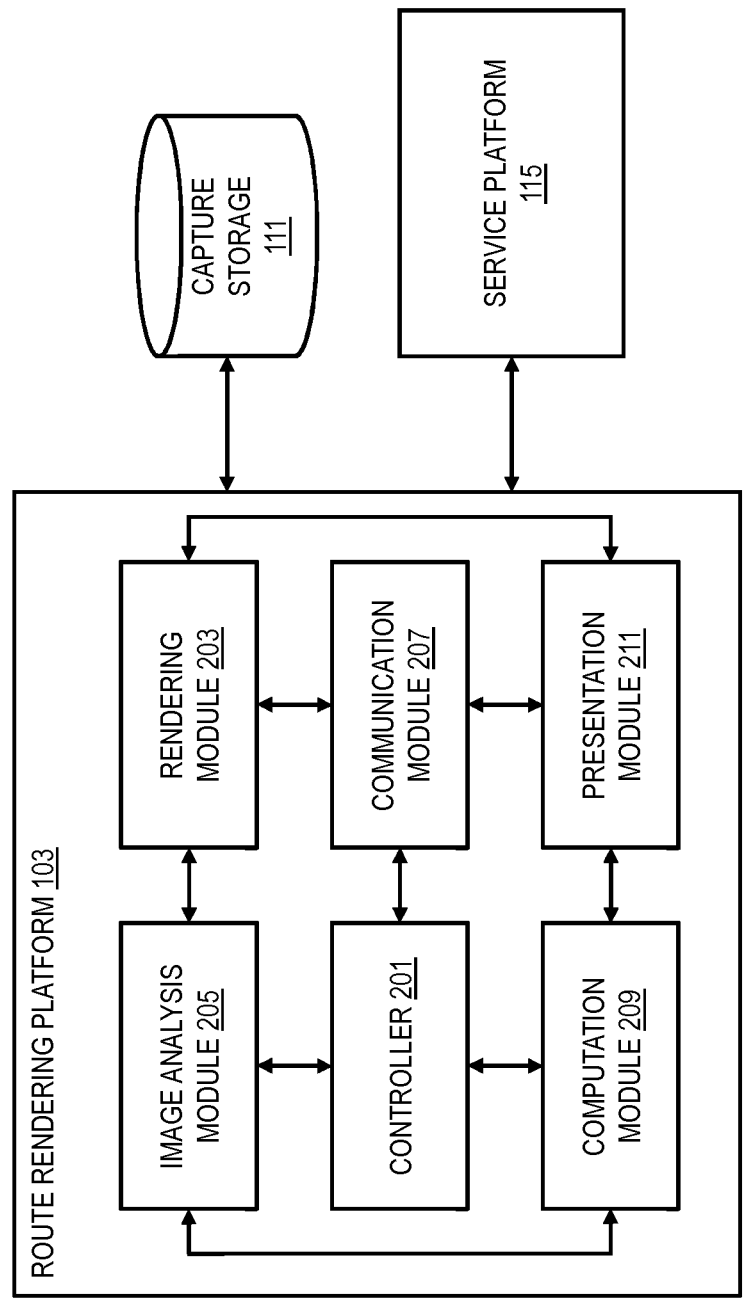
FIG. 2 is a diagram of the components of a route rendering platform, according to one embodiment.

FIG. 2 is a diagram of the components of a route rendering platform, according to one embodiment. By way of example, the route rendering platform 103 includes one or more components for providing route information in image media. It is contemplated that the functions of these components may be combined in one or more components or performed by other components of equivalent functionality. In this embodiment, the route rendering platform 103 includes a controller 201, a rendering module 203, an image analysis module 205, a communication module 207, a computation module 209, and a presentation module 211.

The controller 201 oversees tasks, including tasks performed by the rendering module 203, the image analysis module 205, the communication module 207, the computation module 209, and the presentation module 211. For example, although the other modules may perform the actual task, the controller 201 may determine when and how those tasks are performed or otherwise direct the other modules to perform the task.

The rendering module 203 manages and controls the rendering of route information in one or more image media by, for instance, determining routing information and determining whether the routing information is associated with a particular image. The rendering module 203 may also handle the association of the route information and/or the rendering of the route information with the image file. For example, the rendering module 203 may determine to store the rendered route information as metadata associated with the image file. In another example, the rendering module 203 may also control how the rendering is performed based, at least in part, on one or more characteristics of the routes, user specifications (e.g., level of detail, number of routes, age of routes, etc.), associated privacy policies, and/or the like.

The image analysis module 205 manages and controls the determination of location information, orientation information, and/or other information for determining a field of view of the images. In one embodiment, this information may be derived from the metadata associated with the images at the time of capture. In addition or alternatively, the image analysis module 205 may use the location and/or orientation information to calculate the field of view represented in one or more of the images using equations or tables known in the art for calculating fields of view for different lens arrangements. The field of view describes, for instance, the angular extent of a scene represented in the image to facilitate the correlation of the scene depicted in the image to a three dimensional space in which the route information can be rendered and overlaid.

The communication module 207 manages and controls any incoming and outgoing communication such as data sharing, receiving various requests for route information and/or renderings of the route information from other UEs 101 or the service platform 115, the services 117, and/or the content providers 119. The communication module 207 can also manage other communications of the UE 101 such as telephone calls, text messaging, instant messaging, and Internet communications. For example, as discussed above, the image analysis module 205 may retrieve image data from the service platform 115, via the communication module 207, in order to render route information in the images. The UE 101 may also be connected to storage media such as the capture storage 111 such that the route rendering platform 103 can access or store communication history data. By way of example, if the capture storage 111 is not local, then it may be accessed via the communication network 105.

The computation module 209 performs various computations, including determining fields of view represented in the captured images as well as performing the calculations associated with rendering of the route information. The computational tasks may be in response to a request from other modules, such as the controller 201, the rendering module 203, the image analysis module 205, the communication module 207, or the presentation module 211, to perform various computations.

The presentation module 211 controls display of a user interface such as a graphical user interface to convey information and to allow the user to interact with the UE 101 via the interface. For example, the presentation module 211 may allow the user to request and view route information for one or more images displayed in the user interface. Further, the presentation module 211 interacts with the controller 201, the rendering module 203, the image analysis module 205, and the communication module 207 to display any information generated during their operations.

Figure 3:
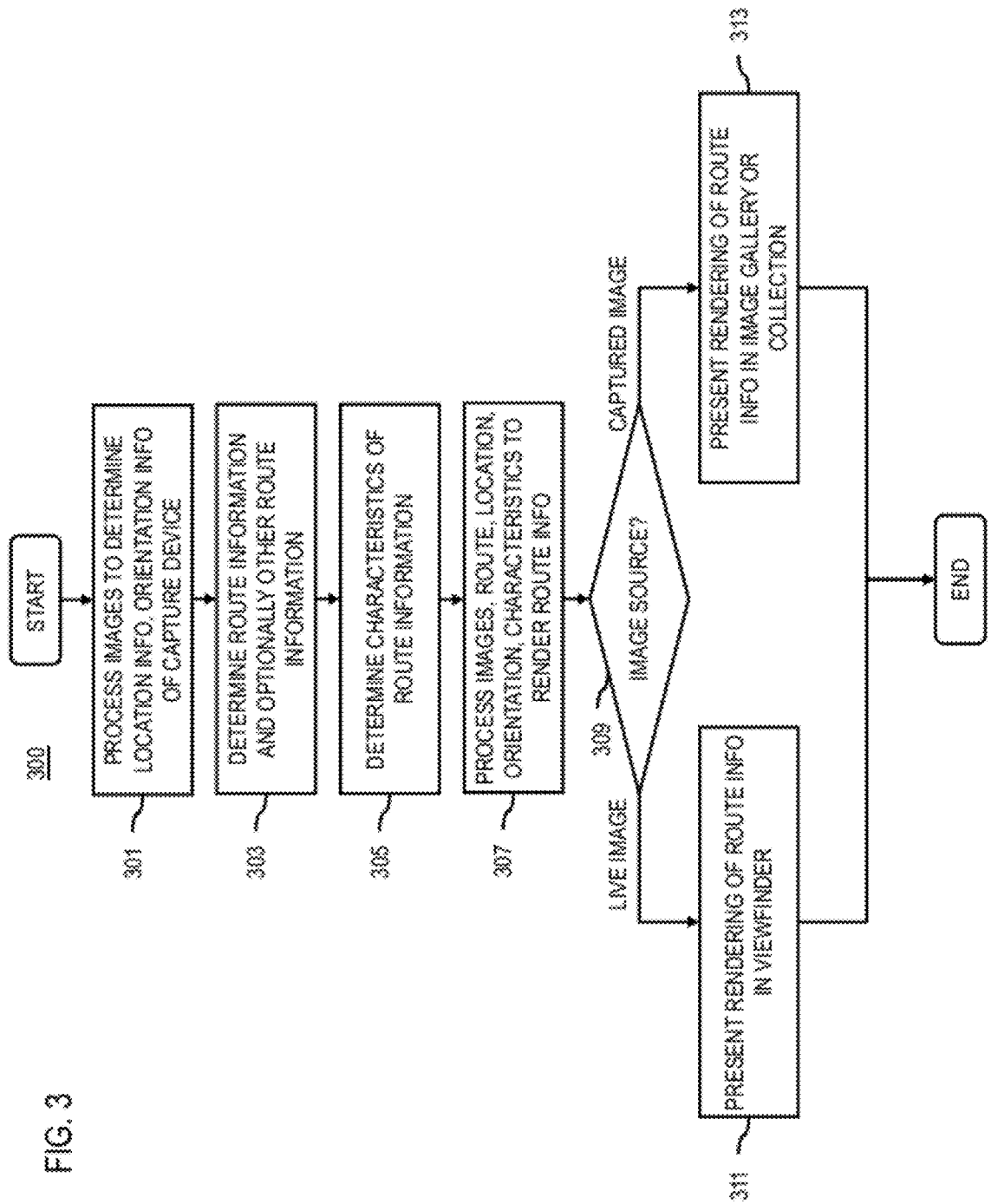
FIG. 3 is a flowchart of a process for providing route information in image media, according to one embodiment.
Figure 7:
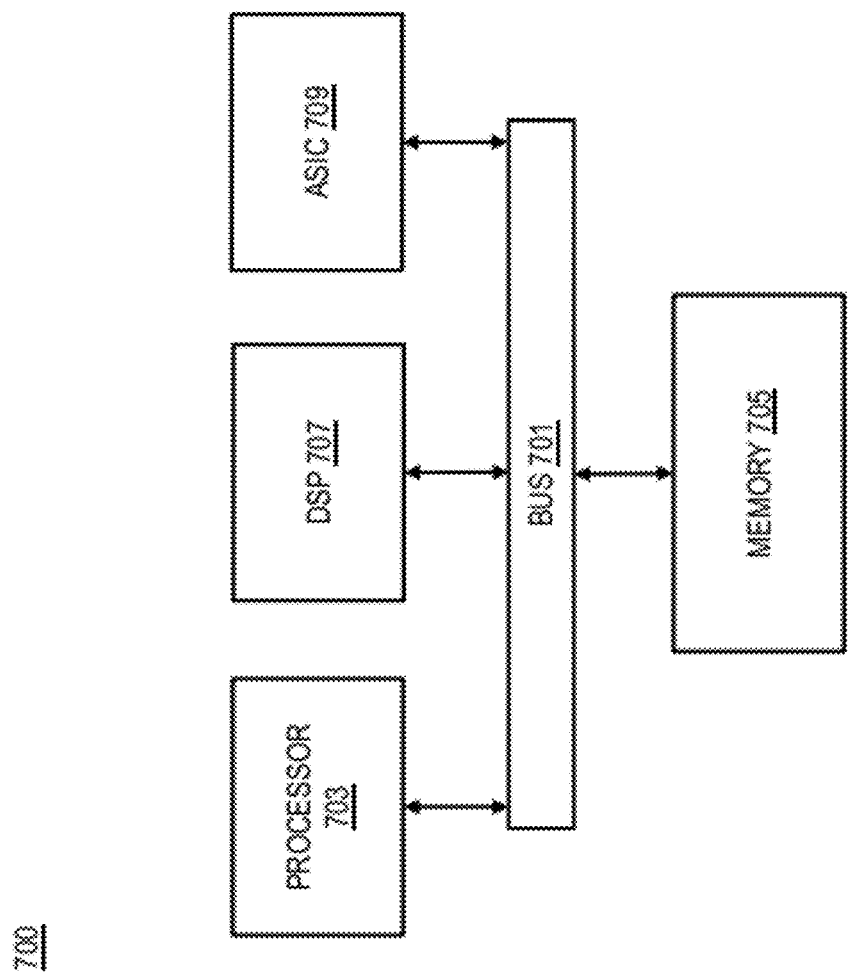
FIG. 7 is a diagram of a chip set that can be used to implement an embodiment of the invention.

FIG. 3 is a flowchart of a process for recognizing objects in media content, according to one embodiment. In one embodiment, the route rendering platform 103 performs the process 300 and is implemented in, for instance, a chip set including a processor and a memory as shown in FIG. 7. In addition or alternatively, the route rendering manager 107 may perform all or a portion of the process 300. In step 301, the route rendering platform 103 processes and/or facilitates a processing of one or more images to determine, at least in part, location information, orientation information, or a combination thereof of a device that captured or is capturing the one or more images. By way of example, the one or more images include, at least in part, a photograph, a video, a virtual reality display, an augmented reality display, or a combination thereof. As previously noted, the images may be a two-dimensional or a three-dimensional image.

Next, the route rendering platform 103 determines route information for rendering in the one or more images (step 303). The route information may include multiple routes traveled by one or more users over a particular geographical area. In addition, the route rendering platform 103 may determine one or more sets of other route information from, for instance, other nearby users, social networking friends, family, and/or any other designated group.

In step 305, the route rendering platform 103 one or more characteristics of the route information. By of example, the one or more characteristics include, at least in part, an age of the route information, a number of routes in the route information, use information about the route information, or a combination thereof. In one embodiment, the user can select from any one or more of the characteristics and/or any one of the routes or portion of the route information for rendering. The route rendering platform 103 then processes and/or facilitates a processing of the one or more images, the location information, the orientation information, the route information, or a combination thereof to generate at least one rendering of at least a portion of the route information for display in the one or more image (step 307).

In one embodiment, the route rendering platform 103 then determines source of the processed image (step 309). If the image source is a live or substantially live image captured from, for instance, the viewfinder of a camera or camera application, the route rendering platform 103 causes, at least in part, presentation of the at least one rendering of the route information in a viewfinder display of the device concurrently or substantially concurrently with the capturing of the one or more images (step 311). In this way, as the user pans a location with the viewfinder, the user can be presented with a rendering of any routes (e.g., the user's routes) that are associated with the location in the camera's field of view.

If the image source is a previously captured image, the route rendering platform 103 causes, at least in part, presentation of the of the at least one rendering of the route information in an image gallery/collection or other application used to view the image (step 313). As noted early, the previously captured image can be an image captured by someone other than the user. In this way, the user can download any image for which, for instance, location information, orientation information, and/or any other information for determining a field of view are available. Route information can then be rendered onto the downloaded image. For example, the user can download a picture of New York City and then view any routes taken by the user or the user's friends through the scene.

Figure 4:
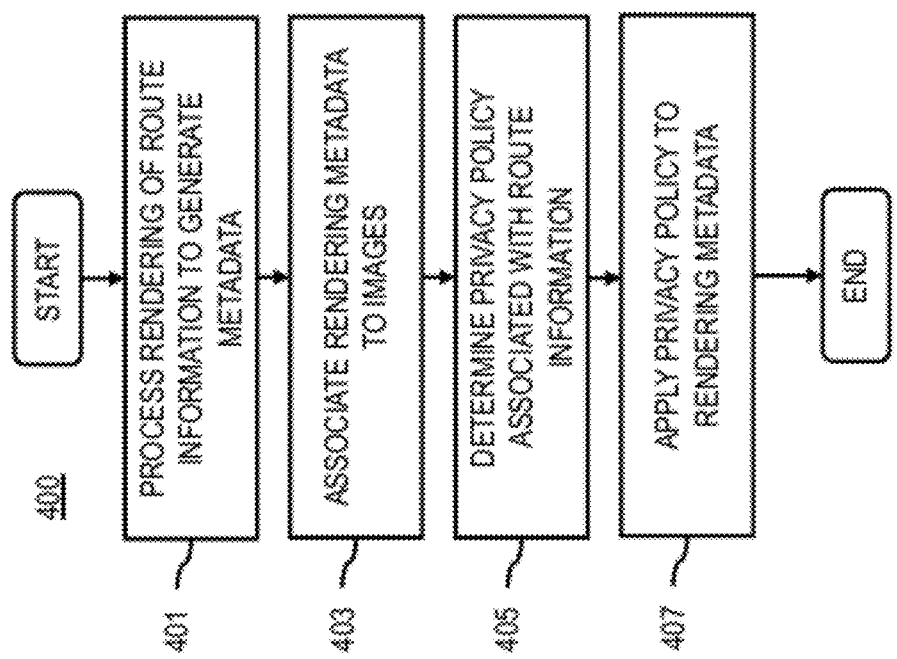
FIG. 4 is a flowchart of a process for associating renderings of route information rendering to image media, according to one embodiment.

FIG. 4 is a flowchart of a process for associating recognition information with instances of a content stream, according to one embodiment. In one embodiment, the route rendering platform 103 performs the process 400 and is implemented in, for instance, a chip set including a processor and a memory as shown in FIG. 7. In addition or alternatively, the route rendering manager 107 may perform all or a portion of the process 400. The process 400 assumes that route information has already been rendered for an image as described with respect to the process 300 of FIG. 3.

In step 401, the route rendering platform 103 processes and/or facilitates a processing of the route information and/or the rendering of the route information to generate metadata. The route rendering platform 103 then causes, at least in part, an association of the route information, the at least one rendering of the route information, or a combination thereof with the one or more images by, for instance, attaching or otherwise associating the metadata with the one or more images (step 403). In this way, the rendering can be viewed subsequently without have to re-determine and/or re-render the route information.

In step 405, the route rendering platform 103 determines a privacy policy associated with the route information. By of example, the privacy policy may be specified by a user, service provider, network operator, device manufacturer, and/or the like. The privacy policy is then applied to the rendering of the route information (step 407). For example, application of the privacy policy may include reducing the detail of certain rendered routes, displaying the rendered routes only to authorized users, prohibiting the attachment of the route information to the image as metadata, requiring encryption of the route information, etc.

Figure 5A:
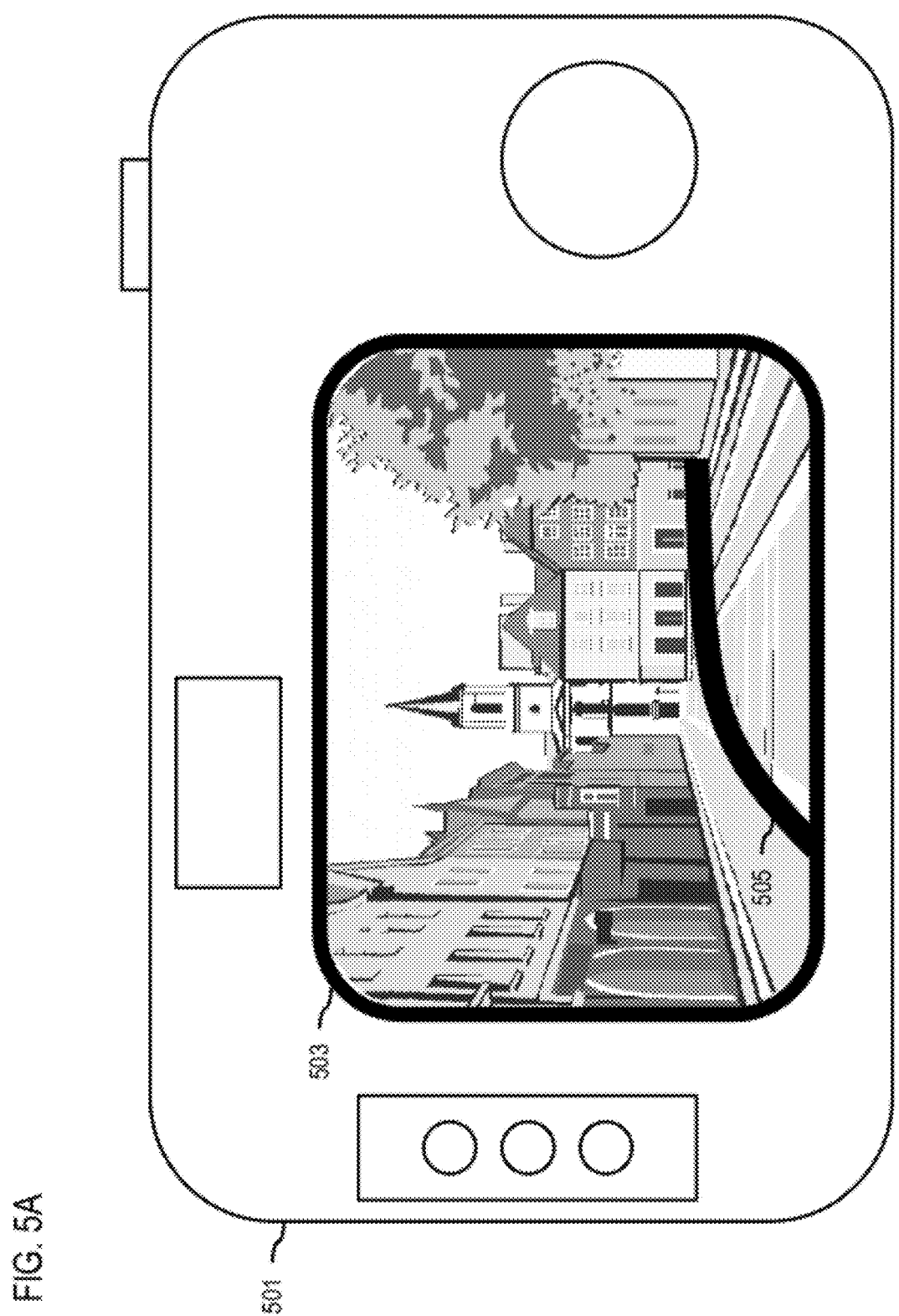

FIGS. 5A-5D are diagrams of user interfaces for depicting rendering of route information in image media, according to one embodiment. More specifically, FIG. 5A depicts the rendering of route information in a camera 501 with a live viewfinder 503. In the example of FIG. 5A, a user has been walking in a city before walking down a street from where the user now takes an image. For example, the image shown in the viewfinder 503 is taken towards the direction where the user just walked. In this case, the walked route 505 is displayed as an additional information layer on top of the viewfinder 503. In this way, the user can get a better picture of where the user has been and how different images taken of the same scene like together. Moreover, the commonality of the route through the scene enables the user to more easily remember or other relate the context behind capturing the picture, thereby facilitating organization of captured images. In one embodiment, the walked route 505 can also be later rendered on top the captured image when viewed in, for instance, a photo gallery application at the UE 101.

FIG. 5B depicts the same camera 501 and viewfinder 503, but the user has zoomed into the scene. On zooming in, the route rendering platform 103 can render the walked route 521 in more detail. As shown, the route 521 now shows that the user has made stops at two different shops along the route. Compared to the rendering of the route 505 in FIG. 5A, the route 505 does not show sufficient detail to indicate that the user has stopped at the two shops. In one embodiment, the user can manually set the level of detail for rendering the one or more routes.

Figure 5C:
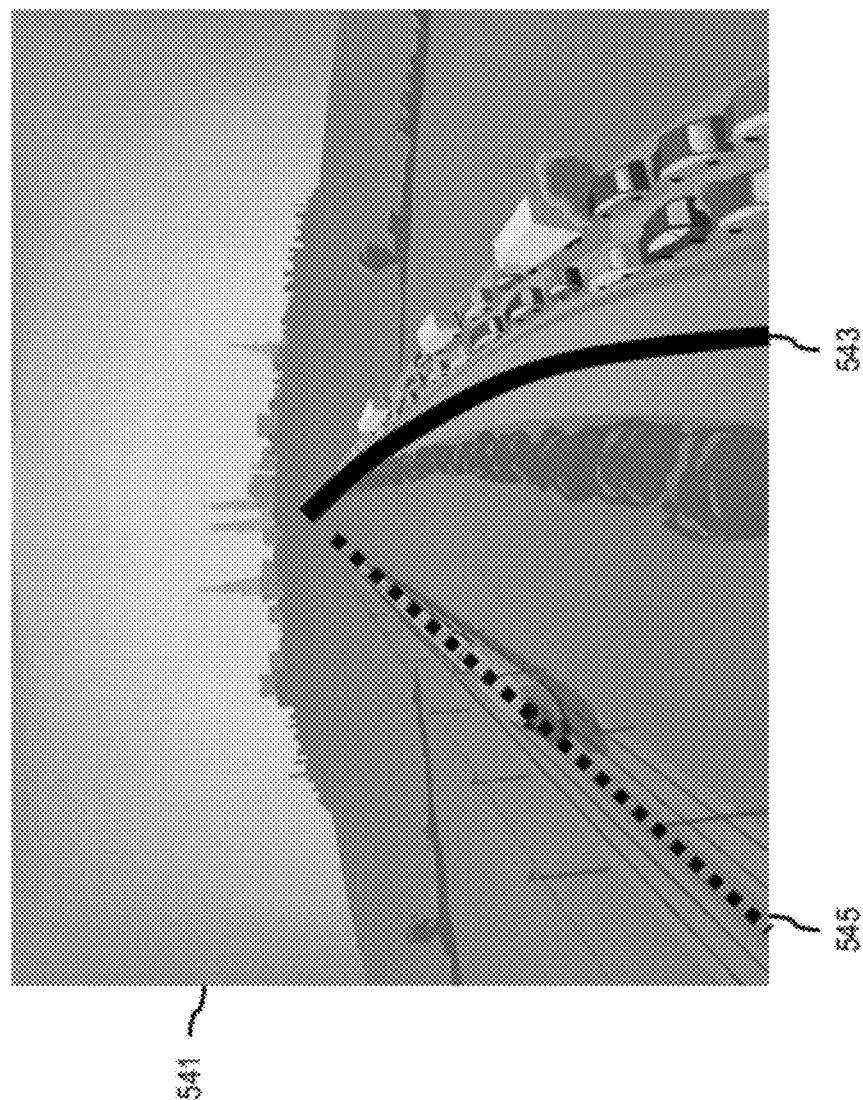

FIG. 5C depicts a previously captured image 541 of a highway entrance into a city. As shown, the route rendering platform 103 has rendered two routes associate with the user. The first route 543 on a highway leading away from the city is rendered as a solid bold line to indicate that this is the most recent route taken by the user. The second route 545 along the train line is rendered as a dotted line to indicate that the route 545 is older than the route 543.

Figure 5D:
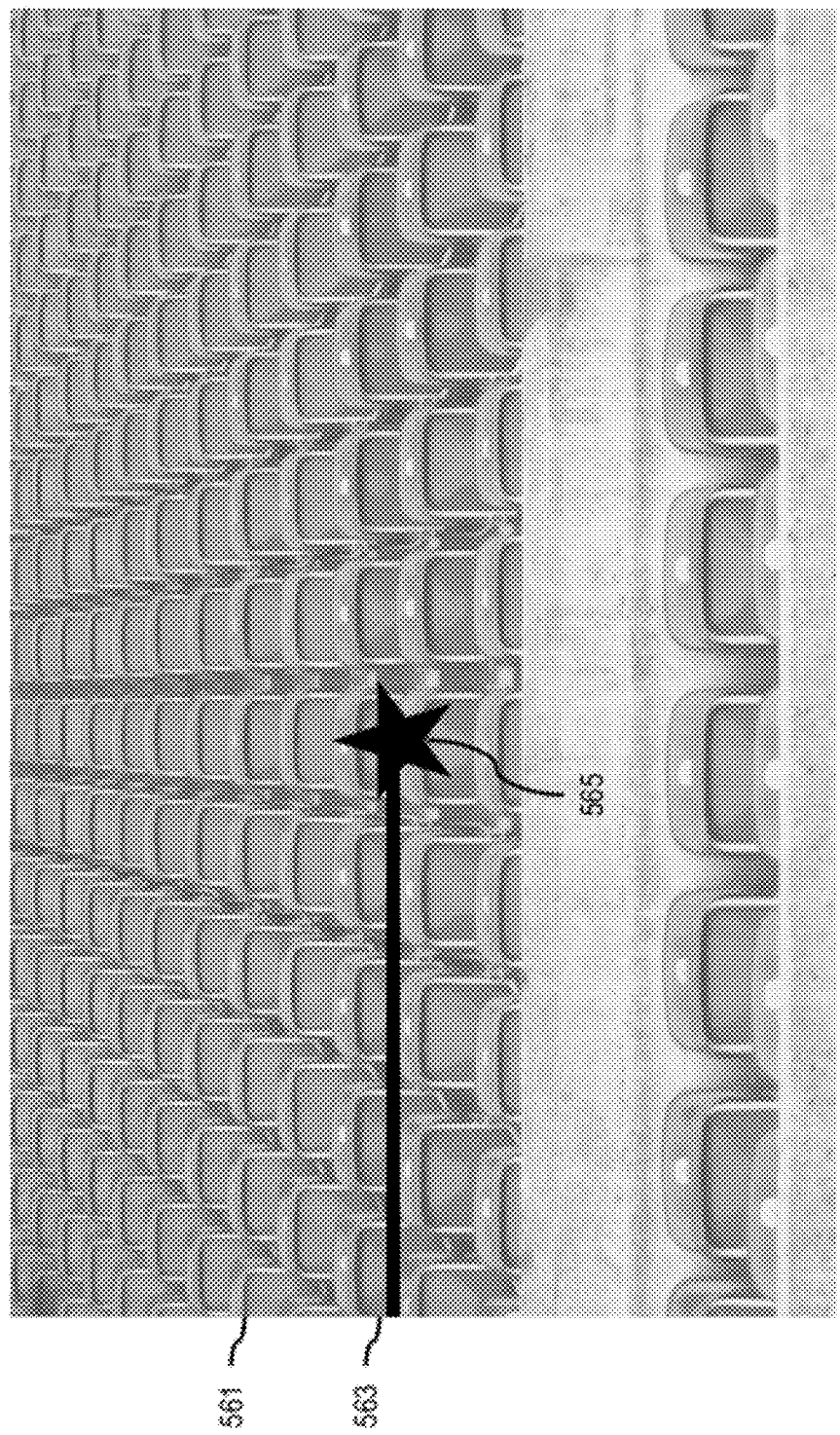

FIG. 5D also depicts a previously captured image 561 of stadium seating. In this example, the stadium is equipped with an indoor positioning system with accuracy down to the seat level. Accordingly, the route information presented in the image 561 is specific to the seat. In this example, the route rendering platform 103 renders a route 563 showing the path the user took to reach his seat. In addition, the route information indicates that the user remained relatively stationary at his seat for over a predetermined period of time. The route rendering platform 103 can interpret the stationary status as indicating that the seat is most likely the user's seat within the stadium and marks that seat with a star symbol 565.

In another use case with respect to, for instance, the stadium, a user can an external camera view or video stream (e.g., provided by the audio-visual facilities of the stadium) with the user's mobile device and see on that image the user's route towards his or her seat. In this way, the user can see where in the stadium the user is moving currently and how to reach his or her assigned seat as marked with the star as illustrated in the image 561.

The processes described herein for providing route information in image media may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
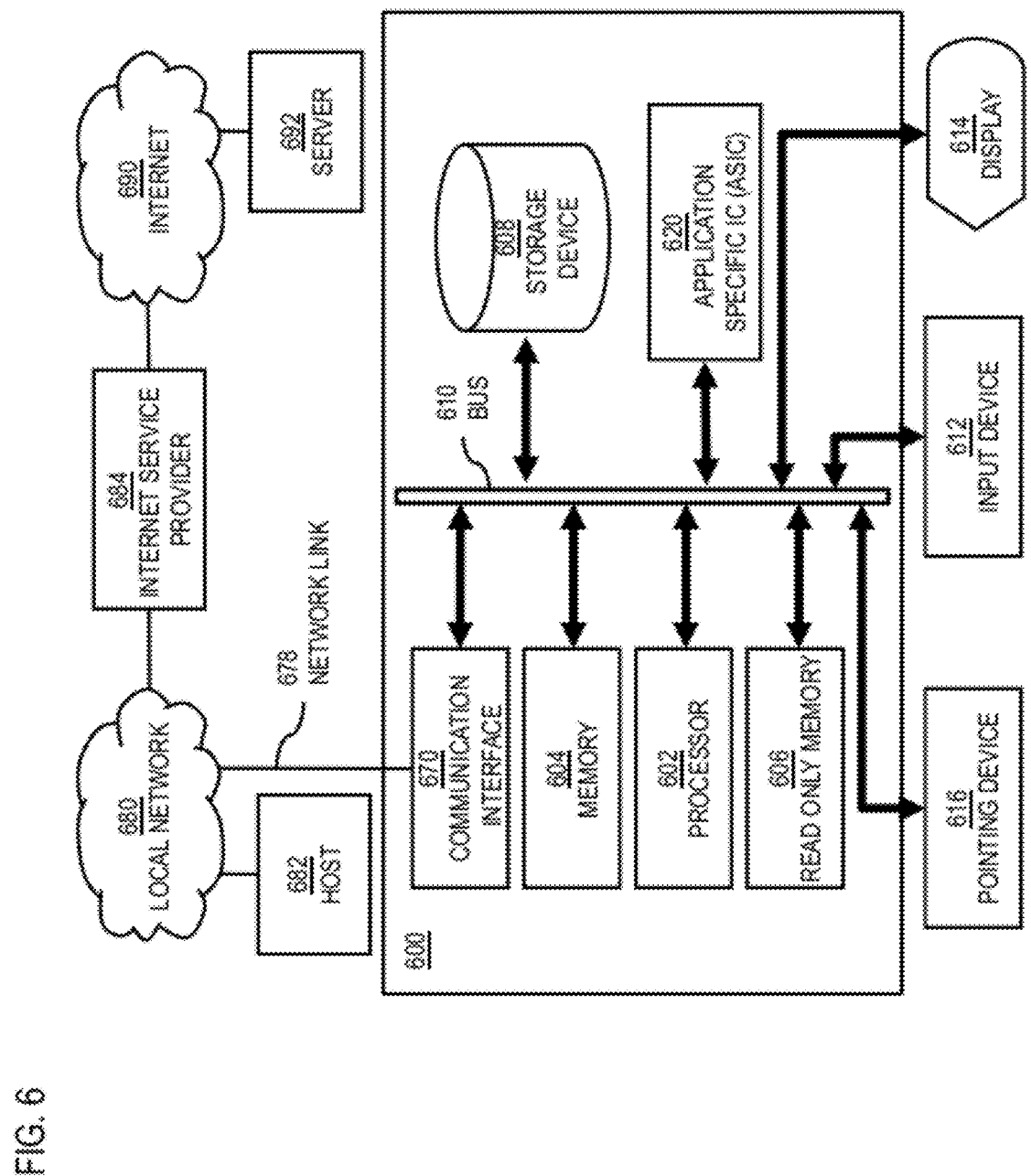
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide route information in image media as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing route information in image media.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to providing route information in image media. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for providing route information in image media. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing route information in image media, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for providing route information in image media.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media.

Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to provide route information in image media as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of providing route information in image media.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide route information in image media. The memory 705 also stores the data associated with or generated by the execution of the inventive steps.

Figure 8:
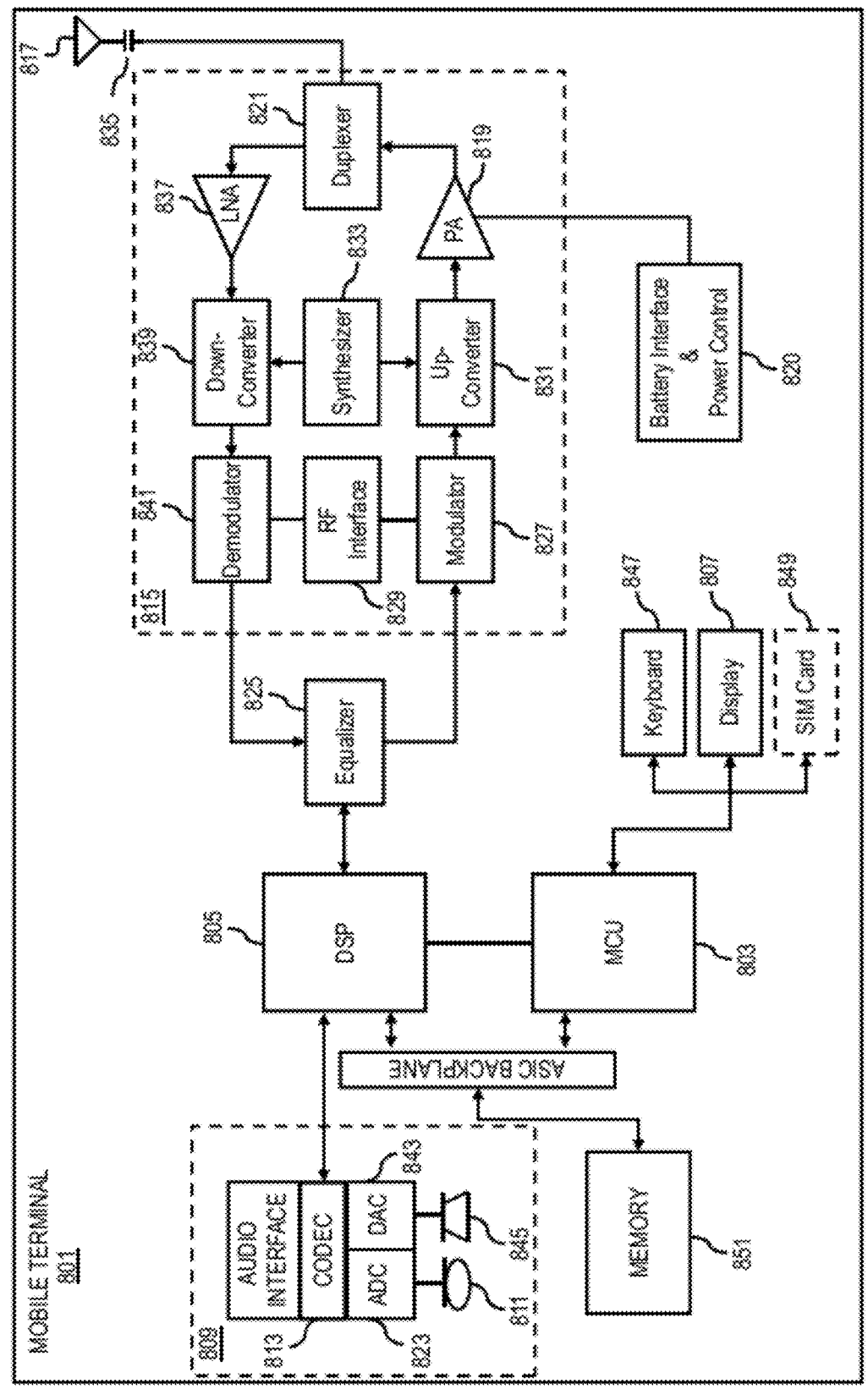
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of providing route information in image media. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of providing route information in image media. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide route information in image media. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
 a processing of one or more images by a user device to determine, at least in part, location information, orientation information, or a combination thereof of the user device while capturing the one or more images or at a time when the one or more images were captured;
 determining route information including one or more routes the device, a user of the device, one or more other users associated with the user, or a combination thereof had traveled; and
 a processing of the one or more images, the location information, the orientation information, the route information, or a combination thereof to generate at least one rendering of at least a portion of the route information for display in the one or more images.

2. A method of claim 1, wherein the (1) data and/or (2) information and/or (3) at least one signal are further based, at least in part, on the following:
 a presentation of the at least one rendering of the route information in a viewfinder display of the device concurrently or substantially concurrently with the capturing of the one or more images.

3. A method of claim 1, wherein the (1) data and/or (2) information and/or (3) at least one signal are further based, at least in part, on the following:
 an association of the route information, the at least one rendering of the route information, or a combination thereof with the one or more images.

4. A method of claim 3, wherein the association is via metadata associated with the one or more images, time-stamped information associated with the one or more images, or a combination thereof.

5. A method of claim 1, wherein the (1) data and/or (2) information and/or (3) at least one signal are further based, at least in part, on the following:
 a privacy policy associated with the route information, wherein the at least one rendering of the route information is based, at least in part, on the privacy policy.

6. A method of claim 1, wherein the (1) data and/or (2) information and/or (3) at least one signal are further based, at least in part, on the following:
 a presentation of the location information, the orientation information, the route information, or a combination thereof in a mapping application, a navigation application, or a combination thereof.

7. A method of claim 1, wherein the (1) data and/or (2) information and/or (3) at least one signal are further based, at least in part, on the following:
 other route information; and
 at least one other rendering of at least a portion of the other route information for display in the one or more images.

8. A method of claim 1, wherein the (1) data and/or (2) information and/or (3) at least one signal are further based, at least in part, on the following:
 one or more characteristics of the route information, wherein the at least one rendering of the route information is based, at least in part, on the one or more characteristics; and
 wherein the one or more characteristics include, at least in part, an age of the route information, a number of routes in the route information, use information about the route information, or a combination thereof.

9. A method of claim 1, wherein the at least one rendering is presented as a layer over the one or more images.

10. A method of claim 1, wherein the one or more images include, at least in part, a photograph, a video, a virtual reality display, an augmented reality display, or a combination thereof.

11. An apparatus comprising:
 at least one processor; and
 at least one memory including computer program code for one or more programs, the at least one memory and the computer program code configured to, with the at least one processor, cause the apparatus to perform at least the following, process and/or facilitate a processing of one or more images to determine, at least in part, location information, orientation information, or a combination thereof of a user device while capturing the one or more images, or at a time when the one or more images were captured;

determine route information including one or more routes the device, a user of the device, one or more other users associated with the user, or a combination thereof had traveled; and process and/or facilitate a processing of the one or more images, the location information, the orientation information, the route information, or a combination thereof to generate at least one rendering of at least a portion of the route information for display in the one or more images.

12. An apparatus of claim 11, wherein the apparatus is further caused to:

cause, at least in part, presentation of the at least one rendering of the route information in a viewfinder display of the device concurrently or substantially concurrently with the capturing of the one or more images.

13. An apparatus of claim 11, wherein the apparatus is further caused to:

cause, at least in part, an association of the route information, the at least one rendering of the route information, or a combination thereof with the one or more images.

14. An apparatus of claim 13, wherein the association is via metadata associated with the one or more images, time-stamped information associated with the one or more images, or a combination thereof.

15. An apparatus of claim 11, wherein the apparatus is further caused to:

determine a privacy policy associated with the route information, wherein the at least one rendering of the route information is based, at least in part, on the privacy policy.

16. An apparatus of claim 11, wherein the apparatus is further caused to:

cause, at least in part, presentation of the location information, the orientation information, the route information, or a combination thereof in a mapping application, a navigation application, or a combination thereof.

17. An apparatus of claim 11, wherein the apparatus is further caused to:

determine other route information; and cause, at least in part, at least one other rendering of at least a portion of the other route information for display in the one or more images.

18. An apparatus of claim 11, wherein the apparatus is further caused to:

determine one or more characteristics of the route information, wherein the at least one rendering of the route information is based, at least in part, on the one or more characteristics; and wherein the one or more characteristics include, at least in part, an age of the route information, a number of routes in the route information, use information about the route information, or a combination thereof.

19. An apparatus of claim 11, wherein the at least one rendering is presented as a layer over the one or more images.

20. An apparatus of claim 11, wherein the one or more images include, at least in part, a photograph, a video, a virtual reality display, an augmented reality display, or a combination thereof.

* * * * *